(12) United States Patent
Goldman et al.

(10) Patent No.: US 7,620,691 B1
(45) Date of Patent: Nov. 17, 2009

(54) FILTERING ELECTRONIC MESSAGES WHILE PERMITTING DELIVERY OF SOLICITED ELECTRONICS MESSAGES

(75) Inventors: Phillip Y. Goldman, Los Altos, CA (US); Richard A. Landsman, Scotts Valley, CA (US); Michael R. Migliore, Palo Alto, CA (US); Jeffrey N. Heiner, Los Altos, CA (US); Jay Logue, San Jose, CA (US)

(73) Assignee: AOL LLC, Dulles, VA (US)

( * ) Notice: Subject to any disclaimer, the term of this patent is extended or adjusted under 35 U.S.C. 154(b) by 0 days.

(21) Appl. No.: 11/651,974

(22) Filed: Jan. 9, 2007

Related U.S. Application Data

(63) Continuation of application No. 10/361,241, filed on Feb. 10, 2003.

(51) Int. Cl.
*G06F 15/16* (2006.01)
(52) U.S. Cl. ...................................... 709/206; 709/204
(58) Field of Classification Search .................. None
See application file for complete search history.

(56) References Cited

U.S. PATENT DOCUMENTS

| | | |
|---|---|---|
| 4,977,520 A | 12/1990 | McGaughey, III et al. |
| 5,040,141 A | 8/1991 | Yazima et al. |
| 5,093,918 A | 3/1992 | Heyen et al. |
| 5,159,673 A | 10/1992 | Sackmann et al. |
| 5,204,961 A | 4/1993 | Barlow |
| 5,245,532 A | 9/1993 | Mourier |
| 5,283,856 A | 2/1994 | Gross et al. |
| 5,319,776 A | 6/1994 | Hile et al. |
| 5,333,266 A | 7/1994 | Boaz et al. |
| 5,377,354 A | 12/1994 | Scannell et al. |

(Continued)

FOREIGN PATENT DOCUMENTS

DE   19708856   9/1998

(Continued)

OTHER PUBLICATIONS

David A. Wheeler, Countering Spam with Ham-Authenticated Email and the Guarded Email Protocol, Draft: First version Dec. 8, 2002; Released Apr. 2, 2003, 28 pages, dwheeler@dwheeler.com.

(Continued)

*Primary Examiner*—David E England
(74) *Attorney, Agent, or Firm*—Workman Nydegger

(57) ABSTRACT

Systems and methods for delivering solicited electronic messages to a client. Senders of electronic messages become authorized senders and electronic messages from the authorized senders are delivered to the intended recipients. Electronic messages from unauthorized senders are not delivered. A sender becomes authorized when a user includes a tracker in the user address that is associated with a particular sender. Electronic messages that include the tracker are only delivered if the sender is the same sender that is associated with the tracker provided by the user. Senders are also authorized by detecting when the user provides a user address to a sender. Users are given the opportunity to opt-in to receiving electronic messages from senders that have registered with the electronic messaging service that provides electronic message services to the users. Authorizing senders in this manner permits the delivery of solicited messages while rejecting unsolicited messages.

14 Claims, 3 Drawing Sheets

U.S. PATENT DOCUMENTS

| | | | |
|---|---|---|---|
| 5,423,042 A | 6/1995 | Jalili et al. |
| 5,448,734 A | 9/1995 | Hrabik et al. |
| 5,471,519 A | 11/1995 | Howe et al. |
| 5,473,671 A | 12/1995 | Partridge, III |
| 5,539,828 A | 7/1996 | Davis |
| 5,548,789 A | 8/1996 | Nakanura |
| 5,600,799 A | 2/1997 | Young et al. |
| 5,604,803 A | 2/1997 | Aziz |
| 5,608,786 A | 3/1997 | Gordon |
| 5,619,648 A | 4/1997 | Canale et al. |
| 5,627,764 A | 5/1997 | Schutzman et al. |
| 5,630,123 A | 5/1997 | Hogge |
| 5,632,018 A | 5/1997 | Otorii |
| 5,655,079 A | 8/1997 | Hirasawa et al. |
| 5,721,779 A | 2/1998 | Funk |
| 5,734,903 A | 3/1998 | Saulpaugh et al. |
| 5,742,668 A | 4/1998 | Pepe et al. |
| 5,742,769 A | 4/1998 | Lee et al. |
| 5,781,857 A | 7/1998 | Hwang et al. |
| 5,796,840 A | 8/1998 | Davis |
| 5,826,022 A | 10/1998 | Nielsen |
| 5,832,227 A | 11/1998 | Anderson et al. |
| 5,835,722 A | 11/1998 | Bradshaw et al. |
| 5,859,967 A | 1/1999 | Kaufeld et al. |
| 5,884,033 A | 3/1999 | Duvall et al. |
| 5,893,911 A | 4/1999 | Piskiel et al. |
| 5,909,589 A | 6/1999 | Parker et al. |
| 5,917,489 A | 6/1999 | Thurlow et al. |
| 5,930,479 A * | 7/1999 | Hall | 709/238 |
| 5,937,162 A | 8/1999 | Funk et al. |
| 5,999,600 A | 12/1999 | Shin |
| 5,999,932 A | 12/1999 | Paul |
| 5,999,967 A | 12/1999 | Sundsted |
| 6,014,634 A | 1/2000 | Scroggie et al. |
| 6,023,723 A | 2/2000 | McCormick et al. |
| 6,052,709 A | 4/2000 | Paul |
| 6,055,510 A | 4/2000 | Henrick et al. |
| 6,057,841 A | 5/2000 | Thurlow et al. |
| 6,073,142 A | 6/2000 | Geiger et al. |
| 6,092,101 A | 7/2000 | Birrell et al. |
| 6,112,227 A | 8/2000 | Heiner |
| 6,154,765 A | 11/2000 | Hart |
| 6,173,322 B1 | 1/2001 | Hu |
| 6,182,118 B1 | 1/2001 | Finney et al. |
| 6,189,026 B1 | 2/2001 | Birrell et al. |
| 6,195,698 B1 | 2/2001 | Lillibridge et al. |
| 6,199,102 B1 | 3/2001 | Cobb |
| 6,199,106 B1 | 3/2001 | Shaw et al. |
| 6,205,432 B1 | 3/2001 | Gabbard et al. |
| 6,226,372 B1 | 5/2001 | Beebe et al. |
| 6,230,188 B1 | 5/2001 | Marcus |
| 6,237,027 B1 * | 5/2001 | Namekawa | 709/206 |
| 6,249,807 B1 | 6/2001 | Shaw et al. |
| 6,266,692 B1 | 7/2001 | Greenstein |
| 6,282,565 B1 | 8/2001 | Shaw et al. |
| 6,349,328 B1 | 2/2002 | Haneda et al. |
| 6,356,935 B1 | 3/2002 | Gibbs |
| 6,366,950 B1 | 4/2002 | Scheussler et al. |
| 6,373,950 B1 | 4/2002 | Rowney |
| 6,393,465 B2 | 5/2002 | Leeds |
| 6,421,709 B1 * | 7/2002 | McCormick et al. | 709/206 |
| 6,457,044 B1 | 9/2002 | IwaZaki |
| 6,460,074 B1 | 10/2002 | Fishkin |
| 6,484,197 B1 | 11/2002 | Donohue |
| 6,546,416 B1 | 4/2003 | Kirsch |
| 6,587,550 B2 | 7/2003 | Council et al. |
| 6,625,257 B1 | 9/2003 | Asaoka et al. |
| 6,640,301 B1 | 10/2003 | Ng |
| 6,671,718 B1 | 12/2003 | Meister et al. |
| 6,678,704 B1 | 1/2004 | Bridge, Jr. et al. |
| 6,691,156 B1 * | 2/2004 | Drummond et al. | 709/206 |
| 6,708,205 B2 | 3/2004 | Sheldon et al. |
| 6,748,422 B2 | 6/2004 | Morin et al. |
| 6,856,963 B1 | 2/2005 | Hurwitz |
| 6,868,498 B1 | 3/2005 | Katsikas |
| 6,880,088 B1 | 4/2005 | Gazier et al. |
| 6,883,095 B2 | 4/2005 | Sandhu et al. |
| 7,043,753 B2 | 5/2006 | Roddy et al. |
| 7,065,341 B2 | 6/2006 | Kamiyama et al. |
| 7,076,533 B1 | 7/2006 | Knox et al. |
| 7,085,925 B2 | 8/2006 | Hanna et al. |
| 7,120,927 B1 | 10/2006 | Beyda et al. |
| 7,136,897 B1 | 11/2006 | Raghunandan |
| 7,185,194 B2 | 2/2007 | Morikawa et al. |
| 7,185,359 B2 | 2/2007 | Schmidt et al. |
| 7,188,358 B1 | 3/2007 | Hisada et al. |
| 7,263,545 B2 | 8/2007 | Digate |
| 7,346,696 B2 | 3/2008 | Malik |
| 7,383,433 B2 | 6/2008 | Yeager et al. |
| 7,512,788 B2 | 3/2009 | Choi et al. |
| 2002/0042815 A1 | 4/2002 | Salzfass et al. |
| 2002/0046099 A1 | 4/2002 | Frengut et al. |
| 2002/0046250 A1 | 4/2002 | Nassiri |
| 2002/0099781 A1 * | 7/2002 | Scheussler et al. | 709/206 |
| 2002/0107856 A1 | 8/2002 | Scheussler et al. |
| 2002/0116641 A1 | 8/2002 | Mastrianni |
| 2002/0147726 A1 | 10/2002 | Yehia et al. |
| 2002/0152272 A1 * | 10/2002 | Yairi | 709/206 |
| 2002/0194308 A1 * | 12/2002 | Hall | 709/219 |
| 2002/0199095 A1 | 12/2002 | Bandini et al. |
| 2003/0009810 A1 | 1/2003 | Lindeman et al. |
| 2003/0023736 A1 | 1/2003 | Abkemeier |
| 2003/0030680 A1 | 2/2003 | Cofta et al. |
| 2003/0037103 A1 | 2/2003 | Salmi et al. |
| 2003/0037250 A1 | 2/2003 | Walker et al. |
| 2003/0065926 A1 | 4/2003 | Schultz et al. |
| 2003/0081621 A1 | 5/2003 | Godfrey et al. |
| 2003/0086543 A1 | 5/2003 | Raymond |
| 2003/0097597 A1 | 5/2003 | Lewis |
| 2003/0110400 A1 | 6/2003 | Cartmell et al. |
| 2003/0163691 A1 | 8/2003 | Johnson |
| 2003/0167311 A1 | 9/2003 | Kirsch |
| 2003/0167402 A1 | 9/2003 | Stolfo |
| 2003/0191969 A1 | 10/2003 | Katsikas |
| 2003/0196116 A1 | 10/2003 | Troutman |
| 2003/0200267 A1 | 10/2003 | Garrigues |
| 2003/0233418 A1 | 12/2003 | Goldman |
| 2003/0236847 A1 * | 12/2003 | Benowitz et al. | 709/206 |
| 2004/0003283 A1 | 1/2004 | Goodman et al. |
| 2004/0015554 A1 | 1/2004 | Wilson |
| 2004/0054887 A1 * | 3/2004 | Paulsen et al. | 713/154 |
| 2004/0087300 A1 | 5/2004 | Lewis |
| 2004/0111480 A1 | 6/2004 | Yue |
| 2004/0143633 A1 | 7/2004 | McCarty |
| 2004/0148358 A1 | 7/2004 | Singh et al. |
| 2004/0167941 A1 | 8/2004 | Prahlad et al. |
| 2004/0199595 A1 | 10/2004 | Banister et al. |
| 2004/0236835 A1 | 11/2004 | Blankenship |
| 2004/0236838 A1 | 11/2004 | Tout |
| 2004/0243676 A1 | 12/2004 | Blankenship |
| 2004/0243698 A1 | 12/2004 | Blankenship |
| 2005/0015481 A1 | 1/2005 | Blankenship |
| 2005/0015482 A1 | 1/2005 | Blankenship |
| 2005/0076220 A1 | 4/2005 | Zhang et al. |
| 2005/0081059 A1 | 4/2005 | Bandini et al. |
| 2005/0188045 A1 | 8/2005 | Katsikas |
| 2006/0101021 A1 | 5/2006 | Davis et al. |
| 2006/0168048 A1 | 7/2006 | Lyle et al. |
| 2007/0016641 A1 | 1/2007 | Broomhall |
| 2008/0162926 A1 | 7/2008 | Xiong et al. |

FOREIGN PATENT DOCUMENTS

| | | |
|---|---|---|
| EP | 0883271 | 12/1998 |

| | | |
|---|---|---|
| WO | 99/10817 | 3/1999 |
| WO | 01/16695 | 3/2001 |
| WO | 02/077768 | 10/2002 |
| WO | 03/044617 | 5/2003 |

OTHER PUBLICATIONS

Foiling Spam with an Email Password System, online, retrieved on Jun. 28, 2004, 10 pages, retrieved from the Internet, http://www.uwasa.fi/~ts/info/spamfoil.html.

J. Klensin et al., IMAP/POP Authorize Extension for Simple Challenge/Response, Sep. 1997, 5 pages.

NAGS Spam Filter, 11 pages, http://www.nags.org/spamfilter.html.

The Penny Black Project, online, retrieved on May 8, 2006, 2 pages, retrieved from the Internet http://research.microsoft.com/research/sv/PennyBlack/.

Paul Hoffman et al., Unsolicited Bulk Email: Mechanisms for Control, Internet Mail Consortium Report UBE-SOL, IMCR-2008, revised May 4, 1998, 16 pages.

Cementing Online Partnerships and Improving User Experience, RSA Security, retrieved online May 17, 2006, 7 pages, www.rsasecurity.com.

Dealing with Unsolicited Commercial Email (UCE, "email spam"), 2005 Public Access Networks Corporation, online, retrieved on Jun. 6, 2006, 3 pages, retrieved from the Internet http://www.panix.com/uce.html, Copyright 2003.

P. Resnick, RFC 2822, Apr. 2001, 51 pages, Qualcom Incorporated, http:rfc.net/rfc2822.html.q.

D.J. Berstein, Variable Envelope Return Paths, Feb. 1, 1997, 2 pages, http://cr.yp.to/proto/verp.txt.

Cynthia Dwork, Fighting Spam: The Science, 2004, pp. 3-4, M. Farach-Colton (Ed.): Latin 2004, LNCS 2976, Springer-Verlag Berlin.

P. Resnick, RFC2822, Apr. 2001, 51 pages, Qualcomm Incorporated, http:rfc.net/rfc2822.html.q.

P. Resnick, RFC28822, Apr. 2001, 51 pages, Qualcomm Incorporated, http:rfc.net/rfc2822.html.q.

* cited by examiner

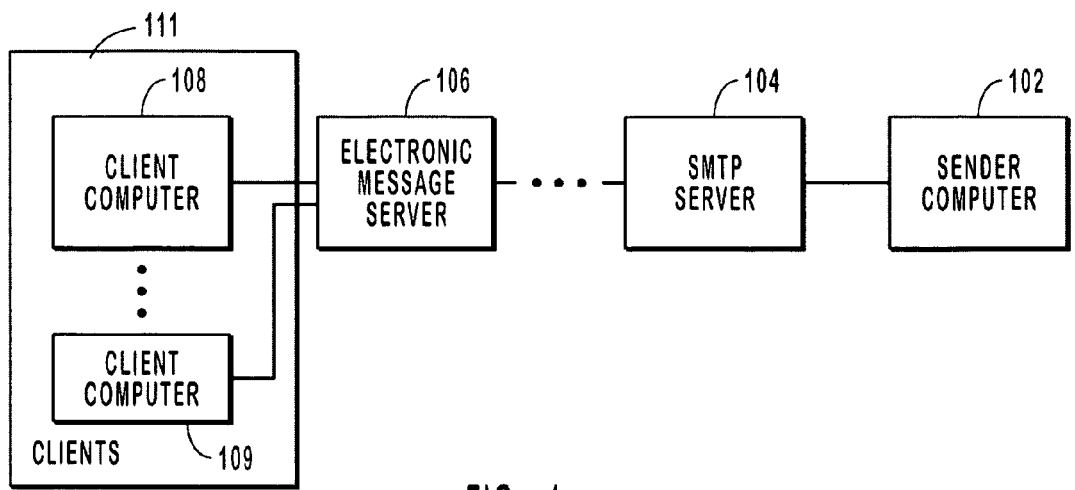
FIG. 1
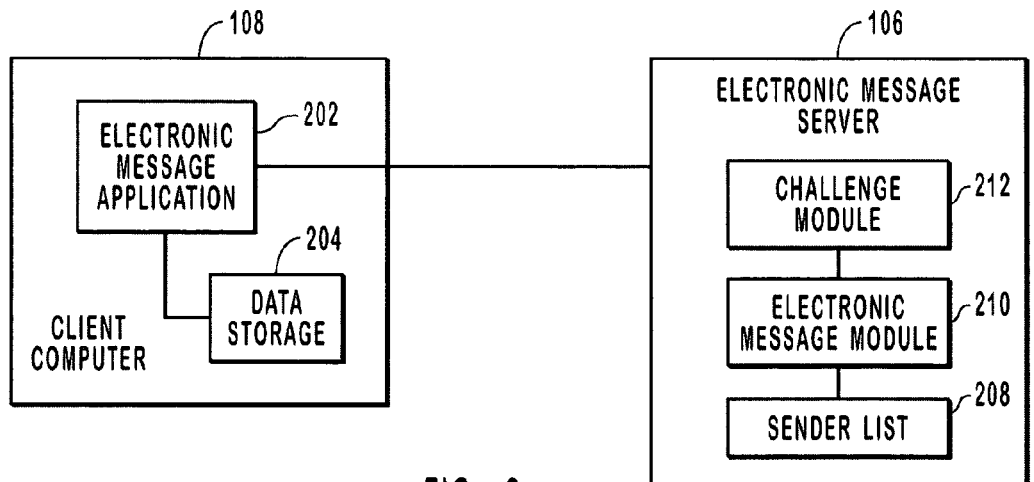
FIG. 2
| SENDER | ATTRIBUTES | | | | | ... |
| --- | --- | --- | --- | --- | --- | --- |
|  | AUTHORIZED | UNAUTHORIZED | UNCONFIRMED | CHALLENGE/RESPONSE | PIN |  |
| SENDER@SENDER.COM | YES | NO | NO |  | CODE |  |
| ⋮ | ⋮ | ⋮ | ⋮ | ⋮ | ⋮ | ⋮ |
FIG. 3

FILTERING ELECTRONIC MESSAGES WHILE PERMITTING DELIVERY OF SOLICITED ELECTRONICS MESSAGES

CROSS-REFERENCE TO RELATED APPLICATIONS

This application is a continuation application of U.S. patent application Ser. No. 10/361,241, filed Feb. 10, 2003, which application is incorporated herein by reference in its entirety.

BACKGROUND OF THE INVENTION

1. The Field of the Invention

The present invention relates to systems and methods for managing electronic messages and for delivering solicited electronic messages. More particularly, the present invention relates to systems and methods for delivering solicited electronic messages while filtering unsolicited electronic messages.

2. The Relevant Technology

Electronic messages such as email and instant messages have become, for a growing number of people and businesses, a convenient method of communication. Unfortunately, the ease with which electronic messages may be generated and sent has led to the development of unsolicited bulk electronic messages, better known as "spam." Unsolicited electronic messages come from a large spectrum of different sources and often include commercial advertisements, political messaging, and other undesirable content including pornographic solicitations.

To many users, it seems that the number of unsolicited messages that they receive increases daily. Receiving unsolicited electronic messages is frustrating for many users because they are required to sort through all of the electronic messages that have been received. If they do not sort through their inbox, the number of unsolicited electronic messages may soon outnumber the desired electronic messages and make it difficult for a user to find certain electronic messages. Users are understandably frustrated with unsolicited electronic messages and often spend quality time sorting through unsolicited electronic messages that they have received on a daily basis. This is true even if the users are simply deleting the unsolicited electronic messages that have been received. With good reason, users have become wary of giving out their electronic addresses for fear that their electronic addresses will wind up in the hands of those who send unsolicited electronic messages.

For these reasons, users need a way to successfully prevent unwanted or unsolicited electronic messages from being delivered. Some attempts have been made to allow users to filter out unwanted and/or unsolicited electronic messages. One method includes allowing a user to "block" a sender's address such that electronic messages from that particular address are not delivered to the user. Other techniques for filtering unsolicited electronic messages involve adding certain words or phrases to filters that are integrated into electronic messaging programs. For example, a user can add certain words to the filters and electronic messages that contain those words are deemed unwanted and are not delivered to the user or are deleted.

One of the primary drawbacks to these solutions is the potential for eliminating or deleting electronic messages that should have been delivered to the user. For example, some online merchants generate bulk electronic messages that are delivered to a large number of users. Many of these users think of these electronic messages as unsolicited and would prefer to have them filtered out and automatically deleted. The methods described above are often suitable for this purpose.

However, there are some users who have subscribed to the electronic mailings of the same online merchants and these users desire to receive the electronic messages that other users view as unsolicited. In other words, current methods of filtering electronic messages cannot determine that a particular electronic message is viewed as an unsolicited electronic message from the perspective of one user while another user views the same electronic message as a solicited electronic message. The problem of delivering solicited electronic messages that look like unsolicited electronic messages becomes even more complex as additional senders of electronic message obtain and use the address of the user. Generally stated, the methods used to prevent electronic messages sent by "spammers" from being delivered often have the undesirable effect of preventing solicited electronic messages from being successfully delivered.

BRIEF SUMMARY OF THE INVENTION

These and other limitations are overcome by the present invention which relates to systems and methods for permitting delivery of solicited electronic messages. Users generally receive and send electronic messages using an electronic message server. The electronic message server often provides electronic message services for a large number of clients or users. Frequently, the users are geographically dispersed. Certain senders are senders of unsolicited electronic messages from the perspective of some users while the same senders are senders of solicited electronic messages from the perspective of other users. One embodiment of the present invention enables the electronic message server to determine which users should receive a particular electronic message and which users should not receive the same electronic message. One advantage of the present invention is the ability to distinguish between automated electronic messages that are solicited and automated electronic messages that are unsolicited.

In one embodiment, a user inserts a tracker (such as personal identification number ("pin"), which is an alphanumeric code,) in the electronic message address that is provided to a sender. The electronic message server then associates the tracker in the user's electronic message address with the specific sender. In one example, the electronic message server also displays the tracker differently than it was entered by the user. When the user or client receives an electronic message from a sender that is addressed to the client using the address that includes the tracker, the electronic message is delivered only if the sender of the electronic message is the same sender that was originally associated with the tracker. The tracker is uniquely tied to a particular sender and only one sender can successfully send electronic messages using the variant of the user's electronic message address that includes the tracker. Alternatively, the tracker can be associated with a particular domain or Internet Protocol (IP) address range.

In another embodiment, a module on the client computer determines when the user enters and submits the user's electronic message address to a sender or a domain of senders through a form on a web site. The module then notifies the electronic message server that the user's address has been provided to a particular sender, domain, or sub-domain. The electronic message server makes that sender or domain an authorized sender and permits electronic messages from that sender or domain to be delivered to the specific client. Electronic messages from the same sender may not be delivered, however, to other users or clients.

In another embodiment of the present invention, electronic messages that may or may not be unsolicited are placed in a temporary folder. Then, a reverse filter is performed on the temporary folder to identify which of the electronic messages may not be unsolicited. Instead of identifying unsolicited electronic messages, the reverse filter identifies potentially valid electronic messages. The intended recipients of those electronic messages are notified that they may have received some valid electronic messages. The intended recipients have the option to review and/or receive the electronic messages that have been deemed potentially valid by the reverse filter.

In another embodiment of the present invention, senders of electronic messages are given the ability to register with the electronic messaging service that is provided by the electronic message server. The users or clients of the electronic messaging service are then given the opportunity to either opt in or opt out of receiving electronic messages from the registered senders. The users who opt in can identify senders from whom they wish to receive electronic messages. Conversely, the users may have the option of opting out of the list of senders compiled by the electronic messaging service. In order to ensure that the users do not receive electronic messages, the electronic messaging service typically presents the list as an opt in list.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

A more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1 illustrates an exemplary system for delivering solicited electronic messages from a sender computer to a client computer while filtering unsolicited electronic messages;

FIG. 2 illustrates an example of an electronic message module used by an electronic message server to delivery solicited messages to a client computer;

FIG. 3 illustrates one embodiment of a sender list that associates attributes with a sender address;

DETAILED DESCRIPTION OF THE PREFERRED EMBODIMENTS

Figure 4:
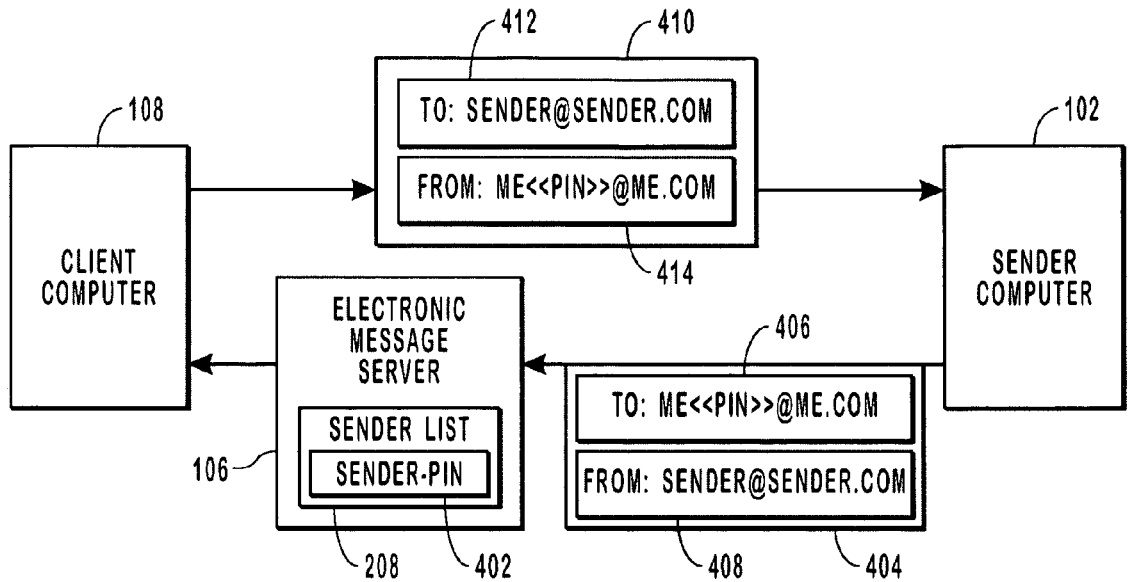
FIG. 4 illustrates using a tracker with an electronic message to authorized the delivery of electronic messages from a sender associated with the tracker included in the electronic message.

Many of the electronic messages delivered to the inboxes of users today are unsolicited. User addresses are available from a variety of sources and various senders utilize those sources to generate and send unsolicited electronic messages. However, there are many instances where electronic messages are solicited. The distinction between an unsolicited electronic message and a solicited electronic message is often dependent on the perspective of the intended recipient. Some recipients have specifically requested certain electronic messages while other recipients view the same electronic messages as unsolicited.

The term "electronic messaging" includes any form of sending a message electronically including, but not limited to, via electronic mail ("email"), instant messaging, and other forms of electronic communication that involve the use of a sender address and a client or user address. Electronic messages including emails, instant messages, and other forms or electronic messages including graphics and attachments, are also within the scope of the present invention. The term "unsolicited" in the context of the invention typically refers to any electronic message that is not desired or wanted by the user even when the user is the only recipient of the electronic message. The term "solicited" typically refers to electronic messages that the user desires to receive. Electronic messages that are sent in bulk can be solicited electronic messages, unsolicited electronic messages, or a combination of both solicited and unsolicited electronic messages.

The present invention further extends to methods and systems for managing electronic messages and more particularly to delivering solicited electronic messages while filtering out unsolicited electronic messages. The present invention addresses the need of determining whether a particular electronic message is solicited or unsolicited from the perspective of the intended recipient and treating the particular electronic message accordingly. Thus, an electronic message that is addressed to multiple recipients may be delivered to some of the recipients and not delivered to other recipients. In other words, one embodiment of the present invention also relates to systems and methods for delivering electronic messages that would otherwise be treated as unsolicited electronic messages. In addition to filtering out unsolicited electronic messages while delivering solicited electronic messages, the present invention can also be applied to electronic messages that are delivered over voice messaging systems, voicemail systems, telephone systems, and the like. Thus, a voice mail or voice message is considered an electronic message.

Advantageously, the present invention is able to take predetermined actions with respect to electronic messages. When a tracker is used by the clients of an electronic messaging service, the clients will begin to receive electronic messages from senders that have included the tracker in the client or user address. The client has usually associated a tracker with one or more senders and can take actions according to whether the tracker in the client address is associated with the sender of the electronic message. If the tracker matches, the electronic message can be delivered to a particular folder. If the tracker does not match, the electronic may be, for example, stored in a temporary folder, deleted, and the like. In addition, the client or user may be notified that a particular sender is using a tracker that is associated with a different sender.

The following overview of electronic messaging is described in the context of email sent over the Internet. FIG. 1 illustrates the operation of an exemplary electronic mailing system over the Internet. Generally, as shown in FIG. 1, a sender computer 102 sends an electronic message to a client computer 108. The electronic message is often routed through one or more simple mail transfer protocol (SMTP) servers 104 before arriving at the electronic message server 106 associated with the clients 111, which are represented by the client computer 109 and the client computer 108. The electronic message is then delivered by the electronic message server 106 to the client computer that corresponds to the intended recipient.

The electronic message server 106 may be a server residing on a local area network with the client computer 108, a server that the client computer 108 accesses via a modem pool or with another Internet connection, a web server that provides web-based electronic messaging services to the client computer 108, a server that operates with the client computer 108 in any of a variety of other network configurations, or the like.

The electronic message server 106 may be remote or local with respect to client computer 108. Depending on the manner in which the invention is implemented, the electronic message server may be a local server that provides services for a local area network, or may be a remote server that provides the electronic message services described herein for a number of geographically distributed client computers. Moreover, the invention can be practiced in a system that collapses the functionality of the electronic message server 106 into the client computer 108.

As shown in FIG. 2, when an electronic message arrives at the client computer 108, an electronic message application 202 processes the electronic message and typically provides a visual and/or audio signal to the client or user that an electronic message has arrived. The client computer 108 can also include other applications such as a calendaring application, a contacts application, and the like. Many computer programs combine an electronic message application with other applications to perform electronic messaging processing and other data management functions. The client computer 108 also includes a data storage device 204 that may store data used by the electronic message application 202 and the other applications. In another embodiment, the electronic message application 202 may be executing on the electronic message server 106.

The electronic message server 106 includes an electronic message module 210 that determines whether a particular electronic message should be delivered to the client computer 108 in accordance with the present invention described herein. The electronic message module 210 implements various methods for permitting delivery of solicited electronic messages to the client computer 108. The electronic message server 106 also has other modules, for example, to ensure that certain electronic messages are not delivered to the client computer 108. These modules typically execute in conjunction with the electronic message module 210 or are part of the electronic message module 210.

The electronic message server 106 maintains a sender address list 208 that stores or includes sender addresses along with several attributes that are associated with each sender address. Each user or client computer of the electronic message server 106 has an associated sender address list 208. Alternatively, one or more clients may share a particular sender address list 208. The electronic message module 210 typically utilizes entries in the sender address list 208 to determine whether a particular electronic message should be delivered to the intended recipient, which corresponds to a user or client computer.

A sender address list is a data structure that relates attributes to senders or sender addresses. The attributes include, for example, authorized sender, unauthorized sender, unconfirmed sender, and the like. Other attributes can be included in the sender address list and associated with each sender address as required. For example, an attribute that indicates whether a sender properly responded to a challenge or responded to the challenge in a timely fashion may also be included in this embodiment of the sender address list 208. Details of the challenge/response protocol are disclosed below. In another embodiment, the sender address list is separated into at least three categories: an authorized senders category, an unauthorized senders category, and an unconfirmed senders category. Sender addresses are placed in each category accordingly.

FIG. 2 also illustrates a challenge module 212 that works in conjunction with the electronic message module 210 and the challenge module 212 helps the electronic message server 106 determine which electronic messages are solicited. When an electronic message is received by the electronic message server 106, the challenge module 212 causes a challenge to be sent to the sender of the electronic message. Often the challenge is an electronic message that is sent to the address included in the sender address portion of the electronic message. The electronic message is usually treated as an unsolicited electronic message unless the sender can properly respond to the challenge issued by the challenge module 212.

In one example, the challenge is an electronic message that includes a link to a web page that may be maintained by the electronic message server 106 or other server. At the web page, the sender is required to enter a confirmation code in order to properly respond to the challenge. Often, the confirmation code is also displayed on the web page. In order to successfully respond to the challenge, a person must respond to the challenge because a machine or computer is preferably unable to read and enter the confirmation code. In this manner, a sender can become an authorized sender and the electronic message may be deemed a solicited electronic message that is delivered to the intended recipient(s). The challenge module can act independently to identify solicited electronic messages from unsolicited electronic messages or can be utilized in conjunction with other embodiments of the present invention.

FIG. 3 illustrates an exemplary implementation of a sender address list 208. In this example, the sender address list 208 includes a plurality of sender addresses represented by the sender address 314. Each sender address is associated with attributes 302 that may include, but are not limited to, an authorized sender attribute 204, an unauthorized sender attribute 206, an unconfirmed sender attribute 308, a challenge/response attribute 310, a tracker attribute 312, and the like or any combination thereof. As previously indicated, each client or user is typically associated with a different sender address list because a sender may be, for example, authorized for one client while being unauthorized for another client. Each attribute can be represented by one or more bits as needed.

The authorized sender attribute 304 indicates whether the sender address 314 is authorized to send electronic messages to the client associated with the sender address list 208. The unauthorized sender attribute 306 indicates that electronic messages from the sender address 314 will not be delivered to the user associated with the sender address list 208.

The unconfirmed sender attribute 308 is used to identify senders that are neither authorized nor unauthorized. For example, an unconfirmed sender may have been sent a challenge that requires a response. A correct response to the challenge will result in the sender becoming an authorized sender and the authorized sender attribute 304 will be set for that sender. An incorrect and/or untimely response to the challenge will result in the unauthorized sender attribute 306 being set for that sender. An example of the challenge/response methods that can be used in this manner to determine whether a sender is authorized to send electronic messages to the recipient is disclosed in U.S. patent application Ser. No. 10/174,561, filed Jun. 18, 2002, which is incorporated herein by reference.

The challenge/response attribute 310 can be used to identify how the sender became either authorized or unauthorized, for example. Alternatively, the challenge/response attribute 310 can indicate whether a particular sender has been sent a challenge and whether the particular sender has provided a response to the challenge. The tracker attribute 312 stores a value that is associated with a particular sender. Typically, each sender has a unique tracker attribute 312 as described in more detail below. There is no requirement that each attribute 302 be used for each sender. For example, the tracker attribute 312 may be empty for one or more sender(s) 316.

In this example, the sender 316 has a sender address 314 of sender@sender.com and the sender address 314 is an authorized address as indicated by the authorized sender attribute 318. The sender address 314 further has a tracker attribute 320 of "code" in this example.

The sender address list 208 can store a variety of different address formats and can hold multiple variations of a sender's address. Also, the sender address list 208 may contain symbolic addresses that do not necessarily refer to a single sender. This enables, for example, all addresses from a particular domain to be categorized. Also, the addresses in the sender address list 208 can be deleted, modified, and/or moved. A sender address typically refers to an address that accompanies an incoming electronic message and either actually identifies or purports to identify the sender.

Using the attributes 302, the electronic message server can determine how an electronic message should be handled. Electronic messages from authorized senders are oz delivered to the intended recipient while electronic messages from unauthorized senders are not delivered to the intended recipients. The status of a particular sender is determined by accessing the sender address list 208 according to the sender address that accompanies the electronic message. Electronic messages from unconfirmed senders are not delivered, in one embodiment, until the sender is confirmed.

FIG. 4 is a block diagram illustrating one example of a system that filters electronic messages while delivering solicited electronic messages. In this example, the client computer 108 sends an electronic message 410 to the sender computer 102. The electronic message 410 may indicate that the user associated with client computer 108 would like to receive electronic messages from the sender computer 102. The sender is identified by the sender address 412 and the user address to which the sender will send electronic messages is identified by the user address 414. The sender computer 102 may be a distributor of mass electronic messages that would normally be filtered out by the electronic message server 106. For instance, the sender computer may be administered by an on-line retailer or another type of merchant that sends periodic electronic messages advertising goods or services that can be purchased from the merchant. As previously stated, however, the electronic messages sent by a distributor of mass electronic messages may be solicited electronic messages.

In the example of FIG. 4, the user address includes several segments, including a domain represented by "sender.com", a base user name represented by "me" and an identifying string, or tracker, represented by "<<tracker>>". The tracker, in one embodiment, is a code or alphanumeric string that is inserted into the user address along with the base user or client name and is provided to the sender computer 102. The client computer 108 also provides the electronic message server 106 with the tracker that was included in the user address 414. The tracker is associated with the sender (402) in the sender list 208. This is accomplished, for example, by placing the tracker in the tracker attribute field that is associated with the sender.

The tracker provided by the user in the electronic message 410 is unique to a specific sender (e.g., specific to the sender associated with sender computer 102) and provides several advantages. First, if the sender provides the user's address to another entity or sender and that sender attempts to send electronic messages to the user, those messages will be filtered out or rejected because the tracker is not associated that sender. In addition, the user knows that his or her address was shared by the original sender that first received the tracker.

In another embodiment, however, the tracker is not specific to a particular sender or sender computer. The tracker, for example, can be a global tracker such that all senders that include the tracker in the user address can send electronic messages to the user. The electronic messages from senders that do not include the tracker may be discarded as unsolicited messages.

In one example, the electronic message server changes how the tracker appears in the user address. In other words, the tracker provided by the user is shown differently than it was provided to the electronic message server. This helps prevent unauthorized senders from obtaining and using the tracker to deliver unsolicited electronic messages to the user.

From the perspective of the sender computer 102, the tracker is a part of the user's electronic message address. Later, the sender computer 102 generates an electronic message 404 that is addressed to the user using the user address 406 that was provided by the user in the electronic message 410. The electronic message 404 may also include the source sender address 408.

When the electronic message server 106 receives the electronic message 404, the electronic message server 106 parses the user address and extracts the tracker from the base user name. Using the sender address 408 and the tracker, the electronic message server can access the sender list 208 and determine whether the tracker included in the user address 406 is associated with the sender address 408. If the association between the sender address and the tracker (402) is present in the sender list 208, then the electronic message 404 is delivered to the client computer 108. If either the tracker or sender address is incorrect, then the electronic message 404 is discarded and treated as an unsolicited message. Alternatively, if the sender is unknown, a challenge can be issued to the unknown sender.

For example, when a user subscribes to a periodic email service, such as one provided by an online merchant, the user enters his or her email address in a field provided in a web site of the merchant. The email address includes a field that contains an identifying string, or tracker, selected by the user. The email address used for the subscription process is often a variant of the basic email address of the user.

For instance, referring to the example of FIG. 4, if the user associated with the client computer were to subscribe to a periodic email service from an on-line bookseller having the name "XYZ Books", the user would select a tracker that becomes part of the user address that the sender computer 102 associated with the on-line bookseller uses to send the periodic email to the user. Moreover, because the user selects a tracker arbitrarily for inclusion into the special-use user address that is to be used by the on-line bookseller, the user can select the tracker to be easily identified or associated in the mind of the user with the on-line bookseller. For instance, the user could select "xyzbooks" as the tracker that is to be incorporated into the user address that is provided to the on-line bookseller. The use of a mnemonic device in this manner enables the user to determine whether the particular merchant, "XYZ Books" has attempted to compromise the confidentiality of this user address. If for example, the merchant were to sell a list of user addresses to a third party spammer or another merchant, the user can easily detect this fact if any third party spammer or another merchant were to later attempt to send an electronic message to the user with the user address mexyzbooks@me.com. In addition, because the disclosure of the user address by the merchant to third parties can be easily detected by the user, the merchant are likely to be dissuaded from compromising user addresses that are associated with the message services of the invention.

When the online merchant sends an email to the user using the address provided by the user, the electronic message server parses the user address and recognizes the inclusion of the identifying string or tracker in the user address and permits the email to be delivered to the user associated with the user name segment of the user address. As previously indicated, a user can select different codes for different online merchants or different mass email subscriptions. The electronic message server recognizes only emails from senders whose domain, sub-domain or address is specifically associated with the service from which the emails were originally requested. One significant advantage of this embodiment of the invention is that the filtering features are enabled simply by the user selecting a tracker or identifying string that is associated with a specific sender, such as a merchant from whom periodic electronic messages are requested. The methods according to this embodiment of the invention do not require software being installed at the client computer 108, nor do they require any cooperation from the entities that send the periodic electronic messages from sender computer 102.

In another example, the client computer 108 is not required to inform the electronic message server 106 of the tracker that was used or sent to a particular sender. Rather, the electronic message server 106 can monitor the user address of electronic messages that are sent by the client computer 106. When the user address in a particular incoming electronic message includes a segment that appears to be a tracker segment in addition to the user name segment, the electronic message server 106 recognizes the tracker and an entry is made in the sender list 208 as described above. In this example, the electronic message server 106 can compare the user address 412 included in the electronic message 410 with an assigned user address to determine if a tracker is present in the user address 412.

In order to facilitate the parsing process applied by the electronic message server to the user addresses specified in incoming electronic messages, the user name segment and the tracker segment can be separated by a delineating or separating character, such as a hyphen "-". For instance, if the domain segment is "me.com", the user name is "me" and the selected tracker is "xyzbooks", the user address supplied to the sender computer 102 could be me-xyzbooks@me.com.

Figure 5:
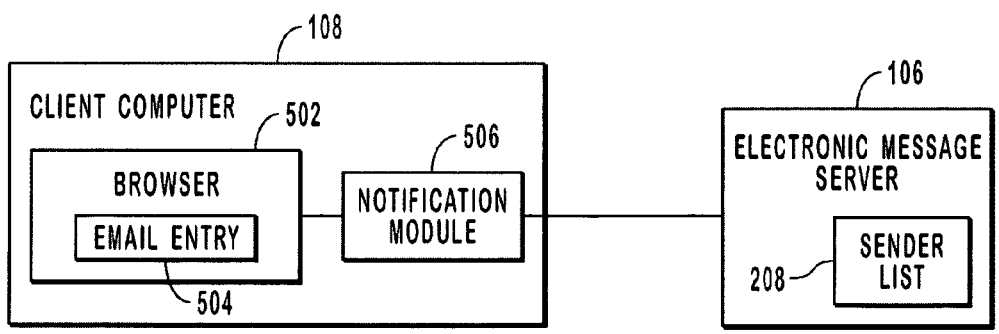
FIG. 5 illustrates a notification module for informing the electronic message server when a user provides their electronic message to a sender or domain.

FIG. 5 illustrates another example of permitting the delivery of solicited electronic messages to a user. In FIG. 5, the client computer 108 includes a notification module 506 that executes concurrently with a browser 502. The notification module 506 monitors the browser 502 and detects when a user enters his or her user address in the browser 502. This occurs, for example, when the user fills out an email entry box 504 while browsing a web site.

When the notification module 506 detects that the user has entered the user address, the electronic message server 106 is notified of that fact. The notification module 506 also provides the electronic message server 106 with the domain associated with the entry of the user address. For example, if a user is browsing a "sender.com" domain and enters his or her user address at in the sender.com domain, the notification module 506 provides this information to the electronic message server 106.

The electronic message server 106 then makes an entry in the sender list 208 to reflect that the user has provided his or her address to a certain sender. With reference to FIG. 3, the domain of the sender is entered as a sender address and the authorized attribute is set for that domain or sender. When electronic messages are received from that domain or from a particular address associated with that domain, then the electronic message is delivered to the user because the authorized attribute has been set by the electronic message server 106. One advantage of the notification module is that the user does not have to manually add a new sender address or domain to the sender list 208. The notification module 506 helps the electronic message server 106 determine which senders are authorized senders.

One advantage of the embodiment illustrated in FIG. 5 is that it does not require the user to select a tracker or identifying string, but instead communicates with the electronic message server 106 to specify that the sender from which the electronic messages have been solicited by the user has now become an authorized sender. This method does, however, generally require that software, such as a plug-in to a web browser, is installed and operates on the client computer 108. According to another variation on the method described above in reference to FIG. 5, the software operating on the client computer 108 modifies the user address that is entered by the user in a web-based form by inserting a tracker or identifying string into the base user name segment of the user address. In this case, the benefits of selecting a tracker that is associated with a specific sender can also be achieved.

Figure 6:
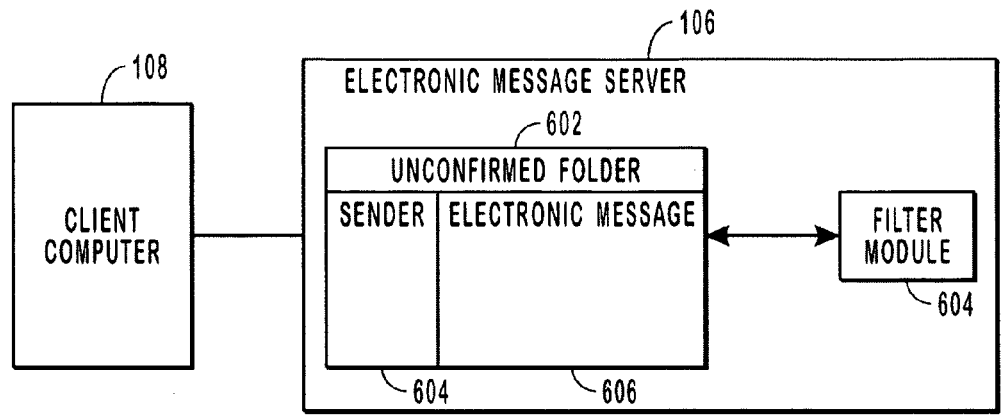
FIG. 6 is a block diagram illustrating a reverse filter that examines electronic messages in a temporary folder to identify potentially valid electronic messages instead of filtering out unsolicited electronic messages.

FIG. 6 illustrates yet another example of permitting solicited electronic messages to be delivered to a client computer or user. At the electronic message server 106, electronic messages from, for example, unknown or unconfirmed senders may be stored in an unconfirmed folder 602. In this example, the unconfirmed folder 602 associates a sender 604 with one or more electronic messages 606. The filter module 604 is executed by the electronic message server 106 periodically or as needed to analyze the electronic messages in the unconfirmed folder 602.

The filter module 604, in one embodiment, is a module that analyzes each electronic message to ascertain if the electronic message is unsolicited. The filter module 604 also identifies those electronic messages that are potentially wanted by the user. The client computer 108 or user is informed that certain messages in the unconfirmed folder 602 may be valid electronic messages and are not unsolicited. The user then has the option of performing various actions on the potentially valid electronic messages. The user can receive those electronic messages and read them, delete the electronic messages without reading them, move the electronic messages to another folder, make the senders of those electronic messages authorized senders, and the like or any combination thereof. One advantage is that potentially valid electronic messages are identified by the filter module 604 before the electronic messages, for example, are permanently deleted. Identifying potentially valid electronic messages may also help the user receive solicited electronic messages more reliably.

The electronic message module of the electronic message server 106 (shown in FIG. 2) utilizes the filter module 604 to help ensure that solicited electronic messages are delivered to the intended recipients of the electronic messages. For example, a user may subscribe to an electronic message service that generates electronic messages automatically. Because the electronic messages are generated automatically, it is possible that the sender of those electronic messages will not respond to a challenge issued by the electronic message server. As a result, electronic messages from that sender may be stored in the unconfirmed folder 602. The filter module 604 can be used in this example to help identify solicited messages by informing the user that the unconfirmed folder 602 potentially includes solicited electronic messages. The filter module 604 identifies the electronic messages and may store them in a separate folder such that the user is not required to sort through all of the electronic messages in the unconfirmed folder to review the electronic messages that have been selected by the filter module 604.

Figure 7:
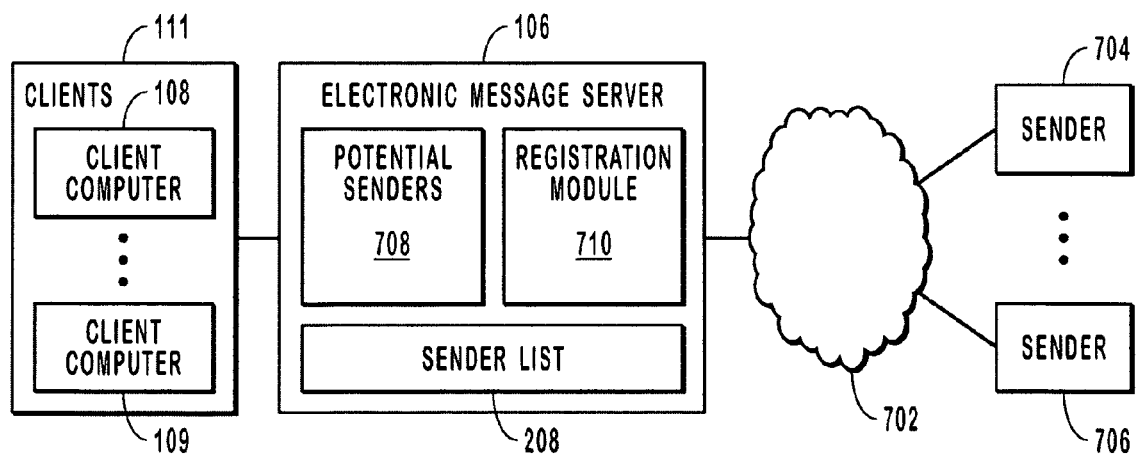
FIG. 7 is illustrates an exemplary system that permits senders to register with the electronic message server such that clients of the electronic message server can either opt-in or opt-out of the electronic messages sent by the registered senders.

FIG. 7 illustrates a system that permits senders to register with an electronic messaging service that is provided using one or more electronic message servers. In this example, the electronic message server 106 includes a registration module 710 that is accessible by senders 704 and 706 over a network such as the Internet 702. During registration, each sender provides information to the electronic message server 106 such as privacy policies, electronic message policies, advertisement policies, and the like that can help a user decide if a particular sender should become an authorized sender or an unauthorized sender.

After a sender, such as sender 704, has registered, the sender 704 is placed in a potential senders list 708. Periodically, the electronic message server 106 distributes the potential senders list 708 to the clients 111 of the electronic message server 106 along with the information that was provide by the senders in the potential senders list 708. In one example, the clients 111 are given the opportunity to opt in with senders that are selected from the potential senders list. For each client, the sender list 208 is populated with the selected senders and the authorized senders attribute is set for the selected senders. The unauthorized attribute of the remaining senders in the potential senders list is then set. The clients 111 may be given an opportunity at a later time to set the authorized attribute of the senders that were not selected.

Alternatively, the senders in the potential senders list 708 are made authorized senders and the clients 111 are given the chance to opt out. In this case, the unauthorized attributes of the senders from which clients opt out are set. In this example, there is a separate sender list 208 for each of the clients 111. This enables a particular sender to be authorized, for example, for the client computer 108 while being unauthorized for the client computer 109.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system that provides an electronic messaging service to one or more clients, a method for managing electronic messages, the method comprising:

detecting a website accessed by a user through a browser application executing on a client computer of the user;

monitoring the browser application to detect when the user enters an email address of the user;

receiving input from the user through the browser application defining a particular sequence of alphanumeric characters that is inserted into the email address of the user;

inserting the particular sequence of alphanumeric characters directly into the email address of the user as a tracker incorporated into the email address of the user;

at an electronic message server, associating the tracker with a domain name of the website accessed by the user as a particular sender that is authorized to send messages to the user;

storing the tracker and the domain name of the website at the electronic message server prior to receiving any electronic messages that contain the stored tracker;

receiving at the electronic message server a first electronic message from a first sender addressed to the user, the first electronic message including a first user address that includes a first tracker;

at the electronic message server, comparing the first tracker with the stored tracker and performing at least one pre-determined action on the first electronic message that includes the first tracker in the first user address based on the comparison; and displaying the first tracker on a user interface of the client computer of the user so that the user can detect whether the first tracker contains the same particular sequence of alphanumeric characters previously input by the user, the particular sequence of alphanumeric characters serving as a mnemonic device so that the user can recognize the particular sequence of alphanumeric characters as being associated with the particular sender.

2. A method as defined in claim 1, wherein performing at least one pre-determined action on the first electronic message that includes the first tracker in the first user address further comprises delivering the first electronic message to the user if the first tracker in the first electronic message matches the stored tracker.

3. A method as defined in claim 1, wherein performing at least one pre-determined action on the first electronic message that includes the first tracker in the first user address further comprises one or more of:

storing the first electronic message in a temporary folder if the first tracker in the first electronic message does not match the stored tracker;

deleting the first electronic message if the first tracker in the first electronic message does not match the stored tracker;

setting an unauthorized attribute of the first sender if the first tracker in the first electronic message does not match the stored tracker; or notifying the user that the first sender used an invalid tracker if the first tracker in the first electronic message does not match the stored tracker.

4. A method as defined in claim 1, wherein the stored tracker is stored in a list.

5. A method as defined in claim 4, wherein the list is stored at the electronic messaging server.

6. A method as defined in claim 4, wherein the list is stored at the client computer of the user.

7. A method as defined in claim 4, wherein the list stores one or more of an authorized sender attribute, an unauthorized sender attribute, an unconfirmed sender attribute, a cHallenge/response attribute, or a combination thereof.

8. In a system that provides an electronic messaging service to one or more clients, wherein unsolicited electronic messages are filtered out by the electronic messaging service, a method for delivering solicited messages to a client, the method comprising:

when a user composes an outgoing electronic message at a client, receiving input from the user specifying an alphanumeric string;

inserting the specified alphanumeric string as a first tracker directly into an email address of the user to form a variant email address of the user;

identifying an electronic address of a recipient of the outgoing electronic message as a particular sender that is authorized to send messages to the user;

storing the first tracker and associating the first tracker with the particular sender prior to receiving from a second sender an incoming electronic message addressed to the variant email address;

receiving from the second sender the incoming electronic message addressed to the variant email address, wherein the incoming electronic message includes a second tracker in the variant email address;

delivering the incoming electronic message to an inbox of the user only if the second tracker in the variant email address of the incoming electronic message matches the stored first tracker and only if the second sender matches the particular sender; and displaying the second tracker on a user interface of the client of the user so that the user can detect whether the second tracker contains the same alphanumeric string previously input by the user, the alphanumeric string serving as a mnemonic device so that the user can recognize the alphanumeric string as being associated with the particular sender.

9. The method as defined in claim 8, wherein the user specifies the client address including the tracker within the electronic message.

10. A method as defined in claim 8, wherein storing the first tracker and associating the first tracker with the particular sender prior to receiving from a second sender an incoming electronic message further comprises storing the first tracker as an attribute of a sender address of the particular sender.

11. A method as defined in claim 10, further comprising setting an authorized sender attribute of the sender address.

12. A method as defined in claim 10, further comprising setting an authorized sender attribute for a domain of the sender address.

13. A method as defined in claim 10, wherein delivering the incoming electronic message to an inbox of the user only if the second tracker in the variant email address of the incoming electronic message matches the stored first tracker and only if the second sender matches the particular sender further comprises:

ensuring that an incoming sender address in the incoming electronic message matches the sender address associated with the stored first tracker, wherein the incoming electronic message is filtered out if the incoming sender address in the incoming electronic message does not match the sender address associated with the stored tracker.

14. A method as defined in claim 8, further comprising ensuring that the first tracker is unique for that client.

* * * * *